No. 750,031. PATENTED JAN. 19, 1904.
P. B. HARRISON & C. F. HUNTOON.
BRAKE RELEASING DEVICE.
APPLICATION FILED SEPT. 21, 1903.
NO MODEL. 2 SHEETS—SHEET 2.
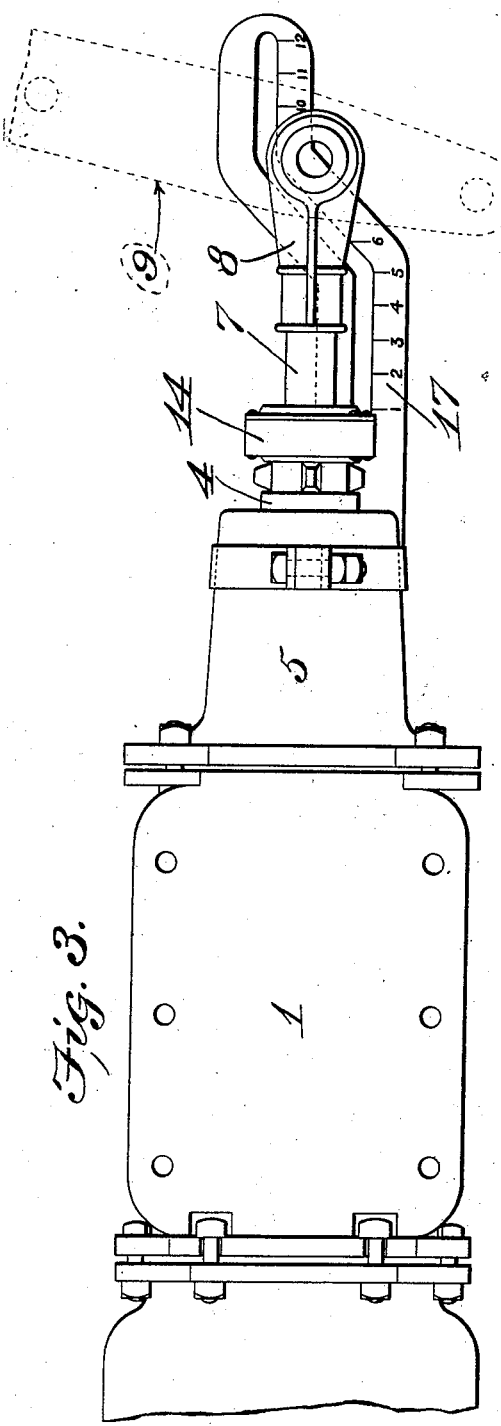
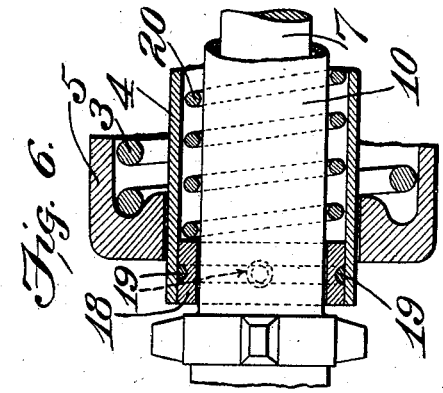
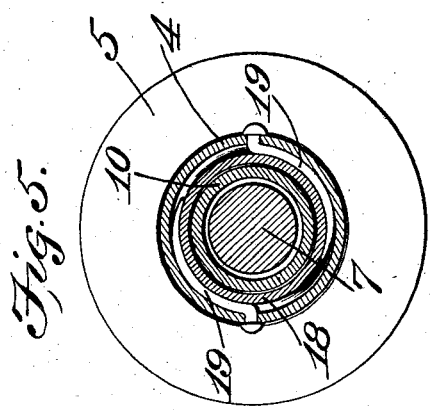
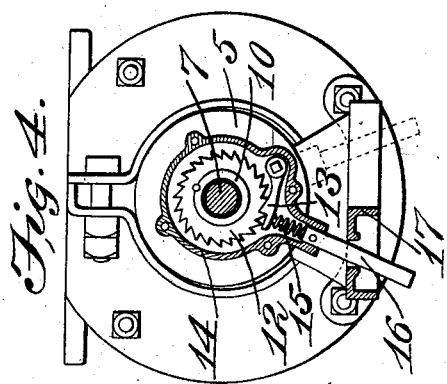
Inventors:
Philip B. Harrison,
Charles F. Huntoon,
by Bakewell & Cornwall
Attys.

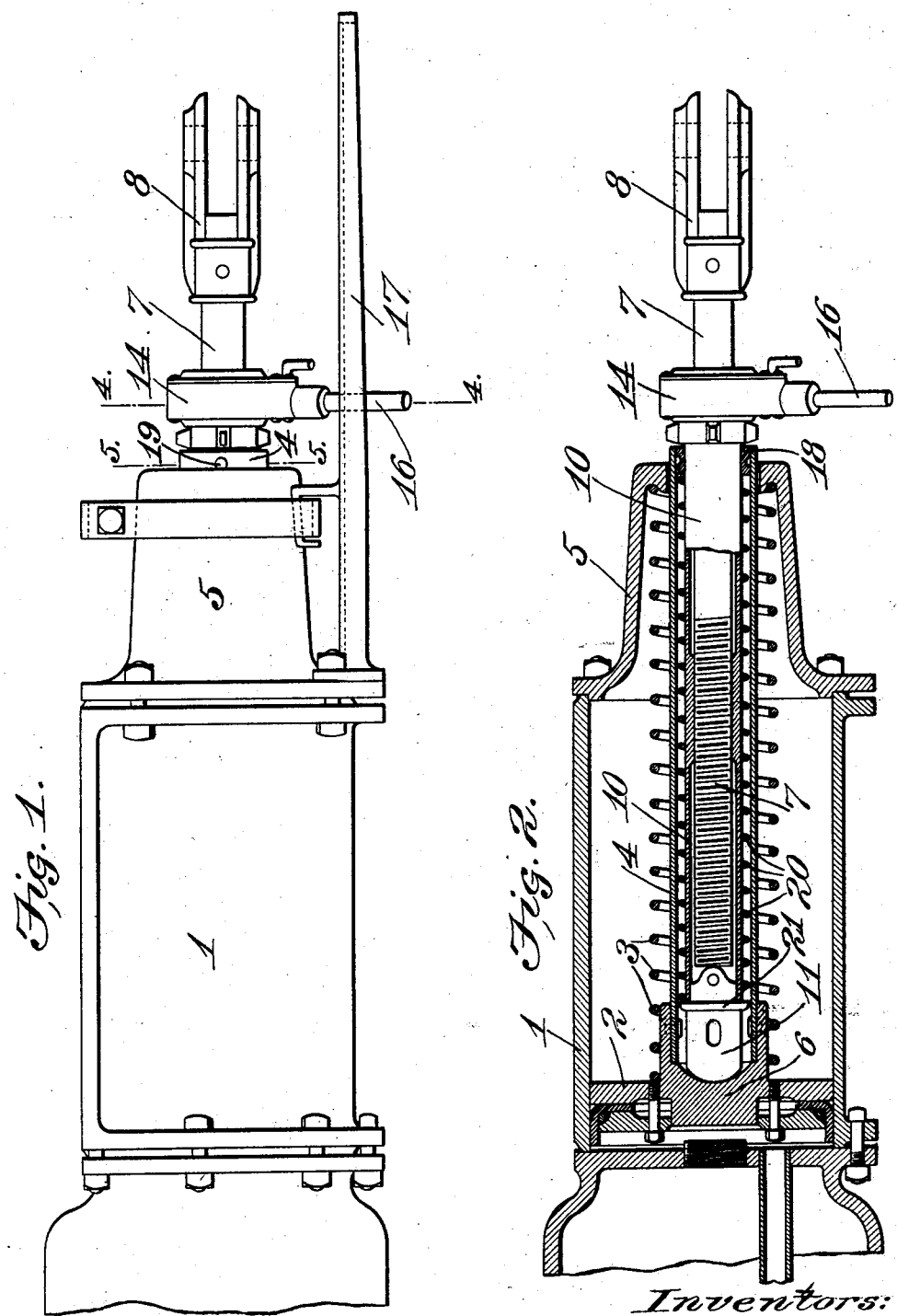

No. 750,031. Patented January 19, 1904.

UNITED STATES PATENT OFFICE.

PHILIP B. HARRISON AND CHARLES F. HUNTOON, OF CHICAGO, ILLINOIS, ASSIGNORS TO CHICAGO RAILWAY EQUIPMENT COMPANY, OF CHICAGO, ILLINOIS, A CORPORATION OF ILLINOIS.

BRAKE-RELEASING DEVICE.

SPECIFICATION forming part of Letters Patent No. 750,031, dated January 19, 1904.

Application filed September 21, 1903. Serial No. 174,039. (No model.)

*To all whom it may concern:*

Be it known that we, PHILIP B. HARRISON and CHARLES F. HUNTOON, citizens of the United States, residing at Chicago, Cook county, Illinois, have invented a certain new and useful Improvement in Brake-Releasing Devices, of which the following is a full, clear, and exact description, such as will enable others skilled in the art to which it appertains to make and use the same, reference being had to the accompanying drawings, forming part of this specification, in which—

Figure 1 is a side elevational view of a brake-cylinder and an approved form of slack-adjusting mechanism arranged thereon with which our improved brake-release is designed particularly to coöperate. Fig. 2 is a vertical sectional view through the brake-cylinder, showing the brake-release in position. Fig. 3 is a top plan view. Fig. 4 is a sectional view on the line 4 4 of Fig. 1. Fig. 5 is a sectional view on the line 5 5 of Fig. 1; and Fig. 6 is a sectional view, partly in elevation, on the line 6 6 of Fig. 5.

This invention relates to a new and useful improvement in brake-releasing mechanisms, the same being designed to coöperate with an air-brake provided with slack-adjusting mechanism such as shown and described in United States Letters Patent granted to John C. Wands, No. 639,798, dated December 26, 1899. We do not, however, wish to limit our invention to use in connection with Wands's slack-adjuster, as the releasing mechanism is capable of application to ordinary brake-cylinders where no slack-adjusters are employed.

In service, irrespective of whether a solid or an extensible push-rod is used, the push-rod is not attached in any way to the air-brake piston, and when the air-brake is released the return of the push-rod and the release of the brake-rigging is dependent upon gravity swinging the brake-beams away from the wheels. The brake-beams when properly hung have sufficient angularity to the brake-hangers to cause the brake-beams to fall away from the wheels; but in practice it is found that these brake-hangers in a great many cases have little or no angularity, with the result that the beams do not fall away from the wheels, being retarded by the friction on the different brake levers and connections, thus causing the brakes to "stick." This sticking of the brakes or failure to release is a very serious matter and gives a great deal of trouble in starting a train.

It is the object of our invention to overcome this difficulty, and this is done by the use of the release mechanism shown in the drawings. Where a slack-adjuster is used in connection with the brake-rigging, it will be appreciated that without the use of this brake-release or some means for positively returning the push-bar the brakes will not only bind, but the slack-adjuster may be rendered inoperative. Another object is to avoid interference with the operation of the air-brake by so locating the releasing mechanism that it in no way affects or retards the power applied to the brakes. It is only upon the return stroke that the release mechanism is brought into action, and being subordinate to the piston-spring it does not prevent the return of the piston to its normal position, but does force the push-bar back to its normal position, so as to release the brakes.

With these objects in view the invention consists in the construction, arrangement, and combination of the several parts, all as will be hereinafter described and afterward pointed out in the claims.

In the drawings, 1 indicates the brake-cylinder, and 2 the piston mounted therein, said piston receiving pressure on its rear face which forces the same forwardly in opposition to the resetting-spring 3. When the pressure is released from behind the piston, this spring serves to return the piston to its normal position, as shown in Fig. 2. The piston carries a hollow rod 4, which extends through the nose 5 of the cylinder, and through this hollow rod the push-bar extends, the same being seated in the socket-casting 6, carried by the piston.

In the type of brake mechanism shown the push-bar is made adjustable in accordance with the Wands's patent mentioned, and consists of a solid rod 7, carrying a fulcrum-casting 8 at its outer end, in which latter is pivoted the cylinder-lever 9. This rod 7 is threaded at its rear end and engages the internal threads of a sleeve 10. The rear or inner end of this sleeve carries an abutment-plug 11, designed to coöperate with the socket-casting 6 on the piston, while the forward end of the sleeve carries a ratchet-wheel 12, fixed thereto and with which coöperates a pawl 13, mounted in a housing 14, loosely mounted on the forward end of sleeve 10. This housing is provided with a laterally-extending nose portion, in which is seated a spring 15, forcing the pawl in toward the ratchet-wheel, said nose extension also carrying a rod 16, which operates in a slot in a bracket extension 17, secured in position upon the nose 5. The slot in this bracket extension 17 is straight for a part of its length, being parallel to the direction of movement of the push-rod, and thence is de-deflected laterally, so that if in the application of the brakes it is necessary for the push-rod to move a greater distance than is ordinarily contemplated to set the brakes such additional movement will rock the housing 14 and cause the pawl to ride back over one or more teeth of the ratchet-wheel, with the result that when the parts are again restored to normal position—that is, when the brakes are released—the housing 14 will be reversely rotated, and the pawl carried thereby will drive the ratchet-wheel, so as to rotate the sleeve 10 with respect to the rod 7 to cause the push-rod to be extended. The excess movement of the push-bar is not always all taken up in one application of the brakes, but in service is usually gradually reduced or absorbed, requiring several applications.

The slack-adjuster shown accommodates itself to the wearing of the shoes and takes up such wear, so that an even application of the brakes is possible at practically all times and the movement of the piston is not interfered with in any respect, said piston traveling its designed distance at each operation. Any excessive movement of the piston will be taken up in rotating the sleeve 10 and extending the push-rod.

So far as the above description is concerned it relates to existing forms, and we will now describe our improved brake-release as applied to an air-brake system including the particular type of slack-adjuster herein shown and described, although we distinctly wish to be understood as not limiting our invention to the use of said brake-release in connection with a slack-adjuster of the type shown or any other type for that matter, as the same is applicable to ordinary air-brake systems where no slack-adjusting system is present.

18 indicates a collar which is introduced and secured in position at the outer end of the hollow piston-rod 4. This collar is preferably grooved in its periphery and is held in position by rivets 19, forced through openings in the forward end of the hollow piston-rod 4 and into and around the grooves in the periphery of the collar 18.

The rear end of the push-rod is provided with a shoulder 21, and between this shoulder and the collar 18 is introduced a spring 20, which spring has a tendency at all times to hold the push-rod in normal position with respect to the piston.

Heretofore where the push-rod was free to move in the hollow piston-rod and depended for its restoration upon the gravitating brake-beams it is obvious that if the beams were not hung properly so as to impart the required movement to the push-rod said push-rod would lie in an intermediate position and not be fully restored when the brakes were released. This intermediate position of the push-rod is peculiary objectionable where a slack-adjuster is concerned, which slack-adjuster depends for its successive operation upon the push-rod making a full stroke at each application of the brakes. It will be observed with respect to our construction, as herein shown and described, that the spring 20 will not in any way interfere with the outward movement of the piston 2 nor with its inward movement. The spring 3 is used to restore the piston-head home when the brakes are released and the spring 20 is employed for forcing the push-rod and its connected parts home. Of course if the brakes stick or bind the spring 20 will not interfere in any way with the operation of spring 3 in forcing the piston-head home; but as the piston-head travels rearwardly it will be observed that any impediment to the return of the push-rod will only result in storing up greater power in the spring 20 until the impediment is overcome, when said spring will act to restore the push-bar and its associate parts to normal position. In this way we get the benefit of the strong spring 3, coöperating with the spring 20, in restoring the parts home. Both springs 3 and 20 are normally under compression at all times.

The air-brake cylinder shown in the accompanying drawings is designed for use on freight-cars and in this respect is different from the air-brake usually employed on passenger-cars. In the latter case the push-rod is connected to the piston, and being attached to the brake-rigging will upon release of the air-brake be forced home by the piston-spring, which piston-spring also restores the brake-rigging, thus releasing the brakes. In the case of a freight air-brake, such as shown in the drawings, the push-rod is independent of the piston, with the result that when the air-brakes are released the piston is returned to its normal position and the brake-rigging is dependent entirely upon gravity for its return and release. The object in having the freight push-bar independent of the air-brake piston is to admit of the application of hand-brakes without dragging the piston out when applying the same. If this push-rod is attached, as in the case of passenger-brakes, it requires a much more complicated system of levers and attachments to admit of the use of the hand-brake without moving the air-brake piston.

We are aware that minor changes in the construction, arrangement, and combination of the several parts of our device can be made and substituted for those herein shown and described without in the least departing from the nature and principle of our invention.

Having thus described the invention, what is claimed as new, and desired to be secured by Letters Patent, is—

1. In an air-brake, the combination with a cylinder and its piston, of a push-bar disconnected from the piston, and means located in the cylinder for restoring the push-bar upon the release of the brakes; substantially as described.

2. In an air-brake, the combination with a cylinder and its piston, of a push-bar disconnected from said piston, and a spring coöperating with the push-bar for returning the push-bar to its normal position upon release of the brakes; substantially as described.

3. In an air-brake, the combination with a cylinder and its piston, of a hollow piston-rod, a push-bar in said rod, a shoulder on the inner end of said push-bar, a shoulder on the outer end of the hollow piston-rod, and a spring interposed between said shoulders for the purpose of returning the push-bar to its normal position upon the release of the brakes; substantially as described.

4. In an air-brake, the combination with a cylinder and its piston, of a hollow piston-rod, a spring for returning the piston home when the brakes are released, a push-rod arranged in the hollow piston-rod, and a spring for returning the said push-bar home upon release of the brakes; substantially as described.

5. In an air-brake, the combination with a cylinder and its piston, of an extensible push-bar independent of the piston, and means in the cylinder for returning said push-bar to its normal position upon release of the brakes; substantially as described.

6. In an air-brake, the combination with a cylinder and its piston, of a hollow piston-rod, an independent extensible push-bar, means for extending said push-bar, and means within the hollow piston-rod for returning said extensible push-bar to its normal position upon release of the brakes; substantially as described.

7. In an air-brake, the combination with a cylinder and its piston, of an independent push-bar, and yielding means in the cylinder for restoring said independent push-bar and its connected rigging to normal position upon release of the brakes; substantially as described.

8. In an air-brake, the combination with a cylinder, its piston, and hollow piston-rod, of a comparatively heavy spring for returning said piston to its home position upon release of the brakes, an independent push-rod, and a comparatively light spring interposed between the hollow piston-rod and the push-rod for restoring said independent push-rod and its connected rigging to its home position after the release of the brakes; substantially as described.

9. In an air-brake, the combination with a cylinder, its piston, and hollow piston-rod, of a comparatively heavy spring for returning said piston home upon release of the brakes, an extensible push-rod arranged in the hollow piston-rod and having a shoulder at its inner end, a shoulder at the outer end of the hollow piston-rod, a comparatively light spring interposed between said two shoulders, and means for extending the push-rod without changing the normal relation of said shoulders; substantially as described.

10. In an air-brake, the combination with a cylinder and its piston, of a push-bar disconnected from the piston, and means so arranged with respect to the push-bar and piston as not to resist the movement of the piston in applying power to the brakes, but which means restores the push-bar upon the release of the brakes; substantially as described.

In testimony whereof we hereunto affix our signatures, in the presence of two witnesses, this 1st day of September, 1903.

PHILIP B. HARRISON.
CHARLES F. HUNTOON.

Witnesses:
E. T. WALKER,
F. D. WILDER.